Patented Sept. 17, 1946

2,407,739

UNITED STATES PATENT OFFICE 2,407,739

PLASTIC CEMENTITIOUS MATERIAL

Gaspare Ferrante, Brooklyn, N. Y., assignor to Grasoph Building Corp., Brooklyn, N. Y., a corporation of New York No Drawing. Application December 2, 1943, Serial No. 512,599

1 Claim. (Cl. 106—98)

This invention relates to new and useful improvements in a plastic cementitious material, and has more particular reference to so-called interior wall plaster.

It is an object of this invention to produce a wall plaster (interior) which is far superior than present day similar plaster.

The invention contemplates the use of brick dust incorporated within the plaster to obtain certain advantages. Bricks have been proven to be an excellent material for outside walls. Brick dust embodies many of the advantageous features of brick material, yet, as far as I know, it has never been used for interior wall constructions.

To better understand the invention it must be recognized that Portland cement, and other cementitious substances are not practical as bases for interior plaster because of their lack of plasticity, or spreading qualities under the mechanic's tool, as well as the lack of adhesion. However, such materials have been made adaptable for these uses by the addition of finishing lime (hydrated lime) used in various proportions as the plaster ingredients are being mixed.

It is general practice to use a plaster base mixture with finishing lime, sand, and similar materials in the construction of interior wall plaster. I have discovered by using brick dust, a far superior plaster is obtained. I have discovered that this plaster material may be used to construct plaster board as well. The improved interior plaster and plaster board have especially good fireproof and waterproof qualities—they are sturdy and strong; they have low heat conductivity and act as good heat insulation material. The improved plaster and plaster board does not readily crack, crumble nor break under ordinary conditions of service. It is particularly well adapted to receive coats of paint and covering materials.

I am aware of the fact that brick dust has been used in connection with concrete to construct artificial bricks. I am also aware that brick dust has been used as a coloring material for plastic materials from which various articles are molded. However, the advantages gained by using brick dust in an interior plaster or plaster board has never been discovered before.

It is another object of this invention to use the largest percentage possible of brick dust in a plaster or plaster board, commensurate with the production of a good interior plaster and plaster board.

I believe that an interior plaster is generally characterized by the use of hydrated lime, and the dominating feature of my invention is the use of brick dust with such plaster.

The improved plaster, in accordance with this invention, may be used for all purposes for which interior plasters are now being used.

Still further the invention proposes an improved plaster and plaster board which may be manufactured and sold at a reasonable cost and which contains nothing of an injurious or deleterious nature.

For further comprehension of this invention, and of the objects and advantages thereof, reference will be had to the following description, and to the appended claims in which the various novel features of the invention are more particularly set forth.

In order to enable others to better understand this invention specific formulas will now be given for a plaster and plaster board embodying the essential features thereof.

Example I

Formula for an interior wall plaster.

| Cement plaster base (interior) | | |
|---|---|---|
| | lbs__ 100 | (71¾%) |
| Finishing lime (hydrated lime) | | |
| | lbs__ 10 | (07½%) |
| Brick dust | lbs__ 20 | (14⅔%) |
| Sand and marble dust | lbs__ 10 | (07½%) |
| Water | gals__ | 10–15 |

The brick dust which I have used with good results was obtained from the nearby New Jersey brick factories. This brick dust I call "Jersey brick dust." The ingredients are mixed together in the usual way used for the making of plaster. It will be found that the plaster has good spreading and adhesive qualities.

Example II

The following formulae may be used for rock lath or plaster boards.

| Finishing lime (hydrated lime) | | |
|---|---|---|
| | lbs__ 60 | (30%) |
| Cement plaster base | lbs__ 100 | (50%) |
| Sawdust | lbs__ 25 | (12½%) |
| Brick dust | lbs__ 15 | (7½%) |
| Water | gals__ | 5–10 |

The plaster boards are made by mixing the materials and working them in the usual ways.

While I have described the preferred embodiments of my invention, it is to be understood that I do not limit myself to the precise formulas herein disclosed, and the right is reserved to all changes and modifications coming within the scope of the invention as defined in the appended claim.

Having thus described my invention, what I claim as new and desire to secure by United States Letters Patent is:

An interior wall plaster, consisting of a mixture of a Portland cement base, 100 lbs.; hydrated lime, 10 lbs.; brick dust, 20 lbs.; sand and marble dust, 10 lbs.; and water, 10 to 15 gals.

GASPARE FERRANTE.